US006853991B1

(12) United States Patent
Kermani

(10) Patent No.: US 6,853,991 B1
(45) Date of Patent: Feb. 8, 2005

(54) FUZZY LOGIC SYSTEM WITH EVOLUTIONARY VARIABLES RULES

(75) Inventor: Bahram Ghaffarzadeh Kermani, Whitehall, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/427,802

(22) Filed: Oct. 27, 1999

(51) Int. Cl.[7] .............................. G06F 9/44; G06N 7/02; G06N 7/06

(52) U.S. Cl. ............................................... 706/52; 13/3
(58) Field of Search ................................ 706/52, 13, 3

(56) References Cited

U.S. PATENT DOCUMENTS

| 4,875,184 | A | | 10/1989 | Yamakawa ...................... 706/3 |
| 5,193,144 | A | | 3/1993 | Tsutsumi et al. ............. 706/60 |
| 5,335,314 | A | | 8/1994 | Tsutsumi et al. .............. 706/1 |
| 5,604,842 | A | | 2/1997 | Nishidai ...................... 706/52 |
| 5,727,130 | A | * | 3/1998 | Hung .......................... 382/155 |
| 6,324,529 | B1 | * | 11/2001 | Kamihira et al. ............. 706/13 |

OTHER PUBLICATIONS

N. K. Chidambaran et al; Adapting Black–Scholes to a Non–Black–Scholes Environment Via Genetic Programming; 1998; IEEE; 98[TH]8367; 197–211.*
G. B. Sheble; Market Based Operation and Planning Simulation and Analysis; 1999; IEEE; INSPEC 6282787; 6/1–6/15.*
"Prognosis with MS Excel," http://www.fuzzytech.com/e_ft4bs2.htm.
"Fuzzy Application Library/Business and Finance Applications/Knowledge–BasedPrognosis," http://www.fuzzytech.com/e/e_ft4bb7.html.
"Other Business Applications," http://www.fuzzytech.com/e_ft4bb8.htm.
"Introduction to Genetic Algorithms," pp. 3–5, http://www.kneehighs.com/intro.html.
"What is Fuzzy Logic?," http://www.emsl.pnl.gov:2080/proj/neuron/fuzzy/what.html.
James F. Brule, "Fuzzy Systems—A Tutorial," http://www.austinlinks.com/Fuzzy/tutorial.html.
"Fuzzy InferenceSystems," pp. 2–19 to 2–27.
Jerry M. Mendel, "Fuzzy Logic Systems and Qualitative Knowledge,"Part III: Articles, pp. 410–413.
David L. Carroll, "A Genetic What?," in: What is a Genetic Algorithm?, http://www.diemme.it/~luigi/ga.html.
Steven D. Kaehler, "Fuzzy Logic—An Introduction," Part 1, http://www.seattlerobotics.org/encoder/mar98/fuz/fl_part1.html.
Steven D. Kaehler, "Fuzzy Logic—An Introduction," Part 2, http://www.seattlerobotics.org/encoder/mar98/fuz/fl_part2.html.
Steven D. Kaehler, "Fuzzy Logic—An Introduction," Part 3 http://www.seattlerobotics.org/encoder/mar98/fuz/fl_part3.html.
Steven D. Kaehler, "Fuzzy Logic—An Introduction," Part 4, http://www.seattlerobotics.org/encoder/mar98/fuz/fl_part4.html.
Steven D. Kaehler, "Fuzzy Logic—An Introduction," Part 5, http://www.seattlerobotics.org/encoder/mar98/fuz/fl_part5.html.

(List continued on next page.)

*Primary Examiner*—Anthony Knight
*Assistant Examiner*—Joseph P. Hirl

(57) ABSTRACT

The fuzzy logic system of the present invention creates fuzzy rules in real-time and updates the fuzzy rules dynamically. This is accomplished by continually optimizing the features, qualifiers, cases, and operators of the fuzzy rules. The fuzzy logic system may be utilized in applications requiring constantly-updated fuzzy rules and also in applications where fuzzy rules are difficult to pre-define due to a large quantity of input data, such as, for example, stock market forecasting.

20 Claims, 4 Drawing Sheets

OTHER PUBLICATIONS

Steven D. Kaehler, "Fuzzy Logic—An Introduction," Part 6, http://www.seattlerobotics.org/encoder/mar98/fuz/fl_part6.html.

"Example Illustrations," http://www.seattlerobotics.org/encoder/mar98/fuz/flcases.html.

Alexander Schatten, "Genetic Algorithms," http://qspr03.tuwein.ac.at/~aschatt/info/ga/genetic.html.

Bahram Ghaffarzadeh Kermani, "Using Neural Networks and Genetic Algorithms to Enhance Performance in an Electronic Nose," IEEE Transactions on Biomedical Engineering, vol. 46, No. 4, Apr. 1999.

Karr et al., "Computer Modelling of Mineral Processing Equipment Using Fuzzy Mathematics," Minerals Engineering, V. 9, No. 2, p. 183–194 (Feb. 1996).

* cited by examiner

FUZZY LOGIC SYSTEM WITH EVOLUTIONARY VARIABLES RULES

FIELD OF THE INVENTION

The present invention generally relates to fuzzy logic systems for conducting a fuzzy inference. In particular, the invention relates to a fuzzy reasoning process and the generation of fuzzy rules using a genetic algorithm which are utilized by the fuzzy logic systems in applications requiring frequent updating, such as stock market forecasting.

BACKGROUND OF THE INVENTION

The concept of "fuzzy theory" was introduced by Lofti Zadeh in the 1960's to allow imprecise decision-making and problem-solving tasks, such as medical diagnosis, to be understood quantitatively. Fuzzy theory is specifically designed to mathematically represent uncertainty and vagueness and provide formalized tools for dealing with the imprecision intrinsic to many problems. Unlike traditional computing which relies on precision, fuzzy theory resembles human reasoning in its use of approximate information and uncertainty to generate a decision.

Fuzzy theory implements classes or groups of data with boundaries that are not sharply defined (i.e. they are fuzzy). Any methodology or theory implementing "crisp" (precise) definitions such as classical set theory, arithmetic and programming may be "fuzzified" by generalizing the concept of a "crisp set" to a "fuzzy set" with blurred boundaries. For example, if it is assumed that a vehicle made in the United States is a "domestic" vehicle and a vehicle made elsewhere is a "foreign" vehicle, and if it is assumed that the set "U" is the set of all automobiles in Los Angeles, and it is desired to classify specific cars within the set "U" as being foreign or domestic, using crisp-set theory, this could be accomplished by simply examining the brand name (e.g. rules are set defining a Toyota as "foreign" and a Ford as "domestic") of each automobile in the set "U". However, consider a situation where a Toyota is manufactured in the United States using some parts made in Japan and others made in the United States. In fuzzy theory a rule could be set to define the percentage of parts for a specific car made in United States and to assign a degree of similarity to what is perceived to be a domestic or foreign car. For example, if 25% of the car parts for a Ford are made in the United States then the car could be considered similar to a domestic car to the degree of 0.25 and similar to a foreign car to degree of 0.75. In such a case, the fuzzy system could conclude, assuming the existence of appropriate rules, that the car is "foreign". Thus, in fuzzy theory an element can reside with degrees of similarity.

Fuzzy theory utilizes linguistic variables whose values are not necessarily numbers, but could also be words and sentences. These linguistic variables are often characterized by membership functions. A membership function provides a measure of the degree of similarity (degree of membership) and the grade of the membership function is typically expressed by numerical values in the region of 0.0 to 1.0, and varies within this range.

Fuzzy logic systems encompassing principles of fuzzy theory emerged into the mainstream of information technology in the late 1980's and early 1990's. Currently most of the prior art fuzzy logic systems use pre-defined fuzzy rules. The fuzzy rules may be provided by experts in the field of use of the fuzzy logic system (e.g., by physicians for a medical diagnosis system) or they may be extracted from numerical data. In either case, the fuzzy rules allow the fuzzy logic systems to handle approximate information in a systematic way.

Fuzzy logic systems are helpful for controlling nonlinear systems and modeling complex systems where an inexact (ambiguous or vague) model exists. Today, fuzzy logic systems are found in a variety of control applications including chemical process control, manufacturing, and consumer products such as washing machines, video cameras, and automobiles. Typical examples of prior art fuzzy logic systems are described in U.S. Pat. No. 4,875,184 (Yamakawa); U.S. Pat. No. 5,193,144 (Tsutsumi et al.); U.S. Pat. No. 5,335,314 (Tsutsumi et al.); and U.S. Pat. No. 5,604,842 (Nishidi), all of which are incorporated herein by reference.

A traditional fuzzy logic system typically consists of a rule based membership function, and an inference procedure. The predetermined rules of the system are represented in a linguistic format e.g. "If x is A and (y is B and z is not C), then w is D."

Here the "IF" is referred to as an "antecedent" and the "THEN" is referred to as a "consequent". x, y, and z are input variables of the antecedent, and A, B, and C are membership functions thereof. w is a variable of the consequent and D is a membership function thereof. Typically, the membership functions, such as A, B, C, and D, are items of vague linguistic information such as "positive", "negative", "large", "medium", or "small".

FIG. 6 depicts a typical prior art fuzzy logic system 10 that is widely used in control and signal processing applications. It contains four components: a fuzzy memory 20, a fuzzifier 30, a fuzzy inference engine 40 connected to the fuzzifier 30, and a defuzzifier 50 connected to the fuzzy inference engine 40.

The rules for the typical fuzzy logic system 10 are pre-defined and stored in the fuzzy memory 20. These rules are expressed as a collection of IF-THEN statements.

The fuzzifier 30 receives crisp inputs and generates a fuzzy input set. The inference engine 40 receives the fuzzy input set from the fuzzifier 30 and combines the fuzzy input set to the fuzzy rules received from the fuzzy memory 20. It then performs a fuzzy inference in accordance with the predefined rules and outputs a fuzzy output set to the defuzzifier 50. The defuzzifier 50 in turn generates an output comprising crisp numbers.

Thus, in a conventional fuzzy logic system, the membership functions and the fuzzy operators are the only variables that can change. The fuzzy rules are predefined, and once defined they are typically not changed because the time required to recalculate and change the rules is prohibitive. As such, it is not practical to use conventional fuzzy logic systems in applications in which fuzzy rules need to be frequently changed, such as in stock market forecasting, because of the tremendous time delays required in calculating and changing the fuzzy rules.

In general, a fuzzy logic rule includes the following variables: Features (e.g., temperature and sky's condition); cases (e.g. cold, hot, cloudy, sunny); operators (e.g., AND, OR, NOT); outputs (e.g. chance of rain); and qualifiers (e.g., high, low, somewhat, medium, very, slightly, none). Thus, for example, using the above examples in a weather prediction program, a rule might read: IF the temperature is hot AND the sky is very cloudy, then the chance of rain is somewhat high."

It is known to utilize a genetic algorithm (GA) for deriving the membership functions and/or rules for a fuzzy logic system. See, for example, U.S. Pat. No. 5,727,130 to Hung, incorporated herein by reference. Prior art methods evolve the output and cases of fuzzy rules using GA's, but do not evolve or modify variables such as features, qualifiers, and operators, i.e., the features, qualifiers and operators of the prior art are considered as fixed values and not variable once they are selected at the beginning. Thus, it would be desirable to have a fuzzy logic system which is not limited by pre-defined fuzzy rules and which has the capability to automatically create and evolve fuzzy rules, features qualifiers, and operators in real-time for use in, for example, stock market forecasting.

SUMMARY OF THE INVENTION

According to the present invention, the features, qualifiers, and operators of rules, and the rules themselves, are continually generated and evolved using genetic algorithms, based on real-time data. This invention is especially useful in stock market forecasting and, in particular, day-trading wherein the pertinent data may change many times over a short period of time.

The method of the present invention is as follows: first, a random set of rules (a population of chromosomes) is generated using a random selection from each of the categories of operators, features, cases, and qualifiers. Next, the population of chromosomes are evolved to improve their fitness function in a known manner. The fitness function is a cost function that penalizes the algorithm if it renders non-compliant results, i.e., results that do not logically follow the trend of the input data. This evolution, which involves computing the fitness function, is done using fuzzy logic. The computation of the fitness function is accomplished by the fuzzy logic process in a known manner. For example, the fitness function can be computed by applying the fuzzy rules to the input data, e.g., data corresponding to stock market activity.

Once the fitness function plateaus for the population (i.e., ceases to improve) the resultant rule (a chromosome) is stored, e.g., in a bin, thereby creating a storage location or "binning pool" in which "optimized" rules are accumulated. The chromosomes then go through further generation (initialization) and evolution to improve their overall fitness function. This process is repeated until adding more chromosomes to the optimized rule pool does not improve the overall fitness of the pool. At this point the algorithm may be stopped and the best chromosomes then define the rules of the system. For example, if it is presumed that a optimized chromosome pool population can contain 15 chromosomes, then once 16 chromosomes have been established, an evaluation is made and the 15 fittest chromosomes are kept while the worst of the 16 is deleted.

Thus, the fuzzy logic system of the present invention creates fuzzy rules in real-time and updates the fuzzy rules dynamically. This is accomplished by continually optimizing the features, qualifiers, cases, and operators of the fuzzy rules. The fuzzy logic system may be utilized in applications requiring constantly-updated fuzzy rules and also in applications where fuzzy rules are difficult to pre-define due to a large quantity of input data, such as, for example, stock market forecasting.

DETAILED DESCRIPTION OF THE PREFERRED EMBODIMENT

Figure 1:
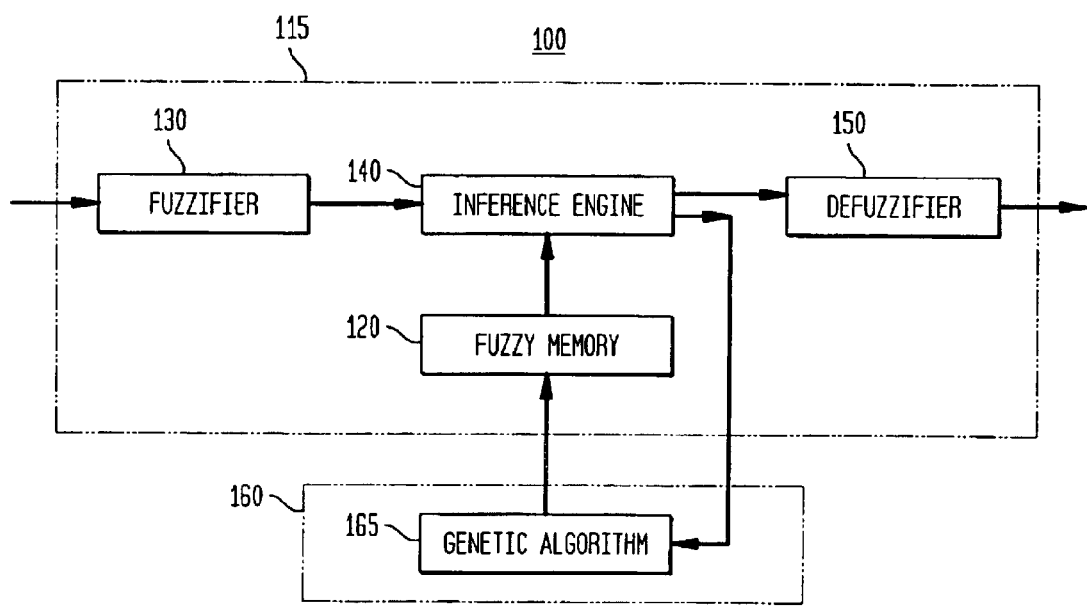
FIG. 1 is a block diagram illustrating various components of the fuzzy logic system of the present invention.

FIG. 1 is a block diagram illustrating various components of an exemplary embodiment of the fuzzy logic system of the present invention.

A fuzzy logic system 100 constructed in accordance with the present invention comprises a fuzzy processor 115, a fuzzifier 130, a fuzzy inference engine 140 connected to the fuzzifier 130, a defuzzier 150 connected to the fuzzy inference engine 140, and a fuzzy memory 120 connected to the fuzzy inference engine 140. Connected to fuzzy processor 115 is a genetic algorithm processor 160. The genetic algorithm processor 160 stores and executes genetic algorithms 165 and has a direct link to the fuzzy memory 120 which stores the fuzzy rules. The fuzzy inference engine 140 is directly connected to the processor 160.

The fuzzifier 130 receives crisp inputs from a database and generates a fuzzy input set to the fuzzy inference engine 140. For example, the database might contain historical daily stock data for the entire market or certain market segments, and might span a period of months or years. The fuzzy inference engine 140 receives the fuzzy input set from the fuzzifier 130 and retrieves the fuzzy rule(s) stored in the fuzzy memory 120. The first time the system is operated the fuzzy memory 120 only contains one default set of rules. The fuzzy inference engine 140 then generates a fuzzy output set by using the default rules and conventional inference procedures. The fuzzy inference engine 140 then provides the fuzzy input set, the fuzzy output set and the default rule(s) to the genetic algorithm processor 160.

The genetic algorithm processor 160 utilizes GAs to create a first new fuzzy rule set and provides this first new fuzzy rule set to the fuzzy memory 120 for storage. As GAs evolve the rule to create a near-optimal fitness in a given environment, the fuzzy rules generated by the genetic algorithm processor 160 improve with each iteration.

The fuzzy inference engine 140 receives the first new fuzzy rule set generated by the genetic algorithm processor 160 and applies this first new fuzzy rule set to the internal logic of the fuzzy inference engine 140. The fuzzy inference engine then generates a new output to the defuzzifier 150 by applying the database information to the fuzzy input set. It then compares the output to the expected output (based on the database information) of the fuzzy output set and determines a fitness function.

The fitness function is a pre-defined parameter measuring an error component between a desired output stored in the database and the actual output (of the fuzzy output set). In an exemplary case, it might be related to a Euclidian Distance. The fuzzy inference engine 140 then forwards the fitness function value to the genetic algorithm processor 160. The genetic algorithm processor 160 uses the fitness function and then creates another set of fuzzy rules which is based on the fitness function value and the previously supplied rules. It then provides another new fuzzy rule set (termed a "better rule") to the fuzzy inference engine 140.

The fuzzy inference engine 140 takes the better rules and applies them to its internal logic engine to create another output. It then compares this output to the expected output as calculated from the data in the database and computes a new fitness function. It also compares the new fitness function value to the old fitness function value from the previous computations. If there is an improvement from the old fitness function value to the new fitness function value, the new fitness function value is forwarded back to the processors running GAs to develop an even better fuzzy rule.

The above iterations continue until the accumulated fitness function value of the population has approached a constant (no improvement is seen or the fitness function value is highest, e.g. error=0). This implies that the processor running the GAs cannot provide better rules for that population, indicating that either a good fuzzy rule having a low error value has been created or that the actual error has been reduced to zero. This process is repeated by evolving new generations, using the previously selected rules of the bin and the newly generated random rules.

The fuzzy inference engine 140 receives the good fuzzy rule from the genetic algorithm processor 160 and utilizes it to create an actual fuzzy output set which is then forwarded to the defuzzifier 150. The defuzzifier 150 receives the actual fuzzy output set and generates a crisp output which is available for use by a plurality of applications.

Figure 2:
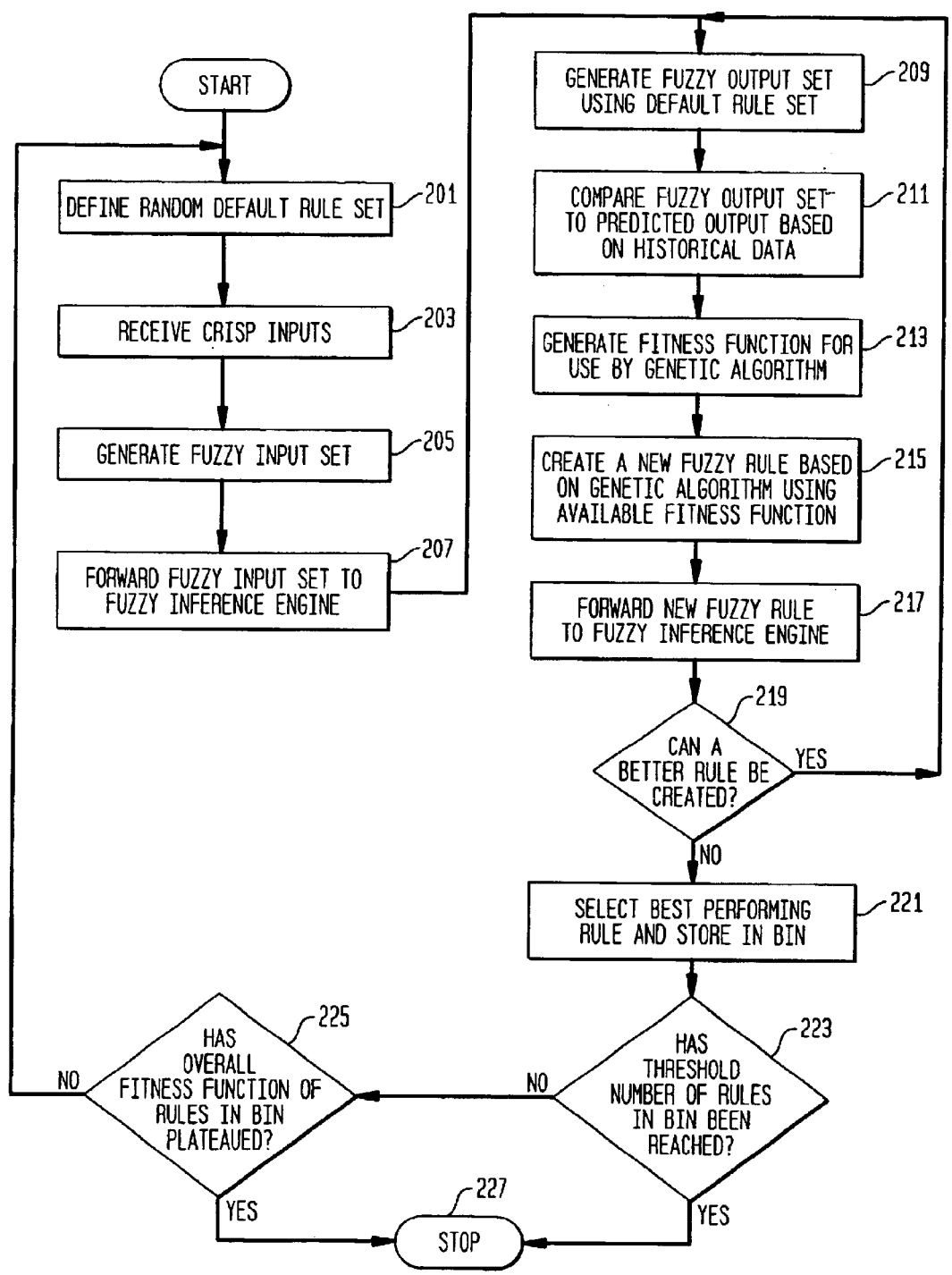
FIG. 2 is a flow chart illustrating the various steps involved in the implementation of the present invention.

FIG. 2 is a flow chart illustrating the various steps involved in the implementation of the present invention.

The fuzzy inference engine 140 defines a random default rule set at step 201. The default rule set is stored in the fuzzy memory 120 and is a generic rule set comprising some of the possible combinations and sub-combinations of features, operators, cases, etc.

In step 203, the fuzzifier 130 receives the crisp inputs and in step 205 it generates a fuzzy input set. In step 207, the fuzzifier 130 forwards the fuzzy input set to the fuzzy inference engine 140.

In step 209, the fuzzy inference engine 140 generates a fuzzy output set based on the random default rule set (defined in step 201) if it is the first iteration, and based on the accumulation of random and previously binned rules for subsequent iterations.

Next, in step 211, the fuzzy inference engine 140 compares the fuzzy output set to the "predicted" output of the fuzzy output set. The predicted output is calculated in a known manner based on historical data stored in the database. Based on this comparison, the fuzzy inference engine 140 computes a fitness function for use by the GA in step 213. The fitness function is a pre-determined parameter and may be a well known error computation variable. In an exemplary case, this fitness function may be the inverse of a Euclidean Distance.

Once the fitness function has been computed, at step 215 the GA of the genetic algorithm processor 160 creates a new fuzzy rule (better rule) based on the new fitness function new fuzzy input set, and new output set. This new fuzzy rule has a lower error (i.e., better/higher fitness function) component than the prior rules. The fuzzy inference engine 140 receives this new fuzzy rule in step 217 and then, at step 219, the new fuzzy rule was analyzed to determined if the new rule can be improved. If it is determined that the new rule can be improved for that population, then the process returns to set 209 wherein the newly created rule is utilized with the default rule set and the steps 209 through 225 are repeated.

If it is determined that the fitness function cannot be further improved, implying that fitness function has either reached a plateau (e.g., becomes substantially constant) or is highest (i.e., the error is zero), then the best performing rule (the new rule) is selected and stored at step 221. This fuzzy rule may not be the optimal rule, as the GAs only can compute the best rule available in a given fuzzy input set and in a given fuzzy output set and the optimal rule may be difficult to determine.

Once the best rule has been evolved from the default rule set this best performing rule is stored (e.g., in a bin) at step 221, and then, in step 223 a determination is made as to whether or not a threshold number of rules stored in the bin has been reached. For example, if there needed to be at least 15 rules stored in the bin before a presumption can be made that the best rules are available for use, and it is determined that 15 rules have been stored, then the process can proceed directly to step 227, at which point the process is stopped.

If, on the other hand, a determination is made that less than 15 rules havebeend stored, then at step 225 a check is made to if the overall fitness function of the rules stored in the bin has plateued. If it has plateued, then the process can proceed to step 227 at which point it is stopped.

If on the other hand, a determination is made that the overall fitness function of the rules in the bin has not plateaued (and that the threshold number of rules in the bin has not been reached), the process returns to step 207 and the rules for the optimal rule set stored in the bin are combined with the newly generated random rules, to make a new population for a new evolutionary process.

When fuzzifier 130 receives a new set of crisp inputs, it creates a new fuzzy input set and a new fuzzy output set which are forwarded to the fuzzy inference engine 140.

Assume for a specific example involving stock market prediction the following set of variables: M=Market Capital; P=Price to Earning Ratio (P/E); V=(Yesterday's Volume)/ (Average of the Last 20 Days Volume); $D_1$=Normalized Stock Price Change of Today −1 (Yesterday); $D_2$=Normalized Stock Price Change of Today −2 (day before yesterday); D3=Normalized Stock Price Change of Today −3; D4=Normalized Stock Price Change of Today −4, D5=Normalized Stock Price Change of Today −5; D7=Normalized Change in the Average Stock Price of the Current Week Compared to the Average Stock Price of Last Week; D30=Normalized Change in the Average Stock Price of the Current Month Compared to the Average Stock Price of the Previous Month; T=Today's Predicted Change.

Assume that the features M, P, and V use fuzzy membership functions with the following possible qualifiers: NA=Not Applicable; S=Small, M=Medium and L=Large. Assume further that the features $D_1$, $D_2$, $D_3$, $D_4$, $D_5$, $D_7$, $D_{30}$, and output features T can have the following possible membership functions (combination of cases and qualifiers): PL=Positive Large (representing a predicted large rise in today's price); PM=Positive Medium (representing a predicted medium rise in today's price); PS=Positive Small (representing a predicted small rise in today's price); ZE=Zero (representing no change in day's price); NS=negative small (representing a predicted small fall in today's price); NM=negative medium (representing a predicted medium fall on today's price); NL=negative large (presenting a predicted large fall in today's price); and NA=not applicable. One way to arrange the above parameters into a genetic algorithm chromosome is to code them into "binary genes". Assume for the variables M, P, and V that the fuzzy membership functions are described as follows: NA=00; S=01; M=10; and L=11. Assume further that for variables $D_1$, $D_2$, $D_3$, $D_4$, $D_5$, $D_7$, $D_{30}$ and T the fuzzy membership functions are described as follows: PL=111; PM=110; PS=101; ZE=100; NS=001; NM=010; NL=001; and NA=000.

All of the above variables can be organized into a chromosome as follows (read top to bottom then left to right):

| M | P | V | $D_1$ | $D_2$ | $D_3$ | $D_4$ | $D_5$ | $D_7$ | $D_{30}$ | T |
|---|---|---|---|---|---|---|---|---|---|---|
| 01 | 11 | 01 | 011 | 100 | 100 | 100 | 100 | 100 | 100 | 100 |

For example, if the following is assumed: Market M is small; Price to Earning Ratio P is large; Normalized Volume V is small; Yesterday's Normalized Stock Price Change D1 had a small drop (e.g., a negative small) and that the stock values had not changed on the day before yesterday or any of the prior 30 days. Finally, assume that, based on historical data, it can be predicted that today's price T will fall by a small amount. The chromosome for this scenario using the above described binary genes would appear as follows:

| MSB: M (upper bit) | D4 (upper bit) |
|---|---|
| M (lower bit) | D4 (middle bit) |
| P (upper bit) | D4 (lower bit) |
| P (lower bit) | D5 (upper bit) |
| V (upper bit) | D5 (middle bit) |
| V (lower bit) | D5 (lower bit) |
| D1 (upper bit) | D7 (upper bit) |
| D1 (middle bit) | D7 (middle bit) |
| D1 (lower bit) | D7 (lower bit) |
| D2 (upper bit) | D30 (upper bit) |
| D2 (middle bit) | D30 (middle bit) |
| D2 (lower bit) | D30 (lower bit) |
| D3 (upper bit) | T (upper bit) |
| D3 (middle bit) | T (middle bit) |
| D3 (lower bit) | LSB:T (lower bit) |

| M | P | V | $D_1$ | $D_2$ | $D_5$ | $D_4$ | $D_5$ | $D_7$ | $D_{30}$ | T |
|---|---|---|---|---|---|---|---|---|---|---|
| 00 | 00 | 00 | 111 | 100 | 001 | 001 | 001 | 001 | 001 | 111 |

The above chromosome is interpreted as follows: regardless of the value of market capital M, price/earning ratio P, and normalized volume V (e.g., each of these values has a binary gene "00" identifying it as "not applicable") if yesterday's stock value $D_1$ shows a positive change, while the stocks had no change the day before yesterday ($D_2$), and the stock has been monotonically decreasing for the past four days, past week, and past month, then today's value T of the stock will rise by a large amount. Other random chromosomes are created for other possible outcomes and their accuracy for prediction can be checked against historical data as well.

A primary reason for utilizing the present invention in the stock market is that stock market prediction may require many different rules to properly, thoroughly and accurately make a prediction. Since an accordance with the present invention the rules are generated "on the fly" instead of being pre-selected, there is no practical limit on the number of rules that can be used. Thus, for example, while the above discussion gives examples of features based on days or weeks (e.g., $D_1$ and $D_7$), the features can be based on any time frame, e.g., minutes, seconds, years, etc.

Figure 3:
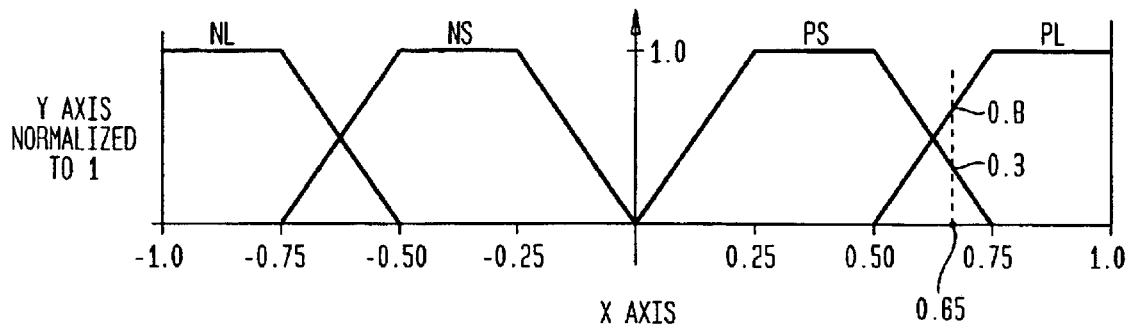
FIG. 3 is a graph showing the points of intersection of specific values for an exemplary feature $D_1$.
Figure 4:
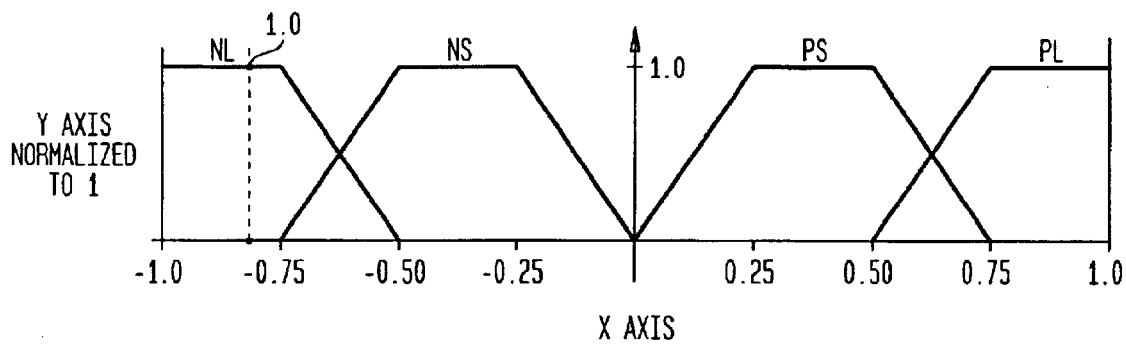
FIG. 4 is a graph showing the points of intersection of specific values for an exemplary feature $D_2$.
Figure 5:
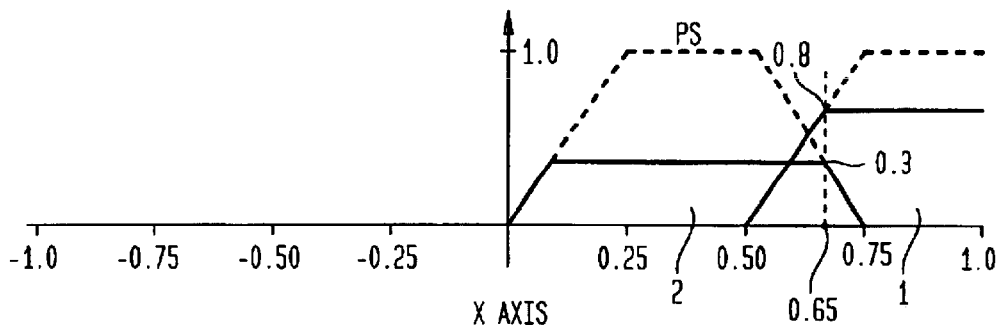
FIG. 5 is a graph showing the results of the application of two exemplary rules on the exemplary features of FIGS. 4 and 5.
Figure 6:
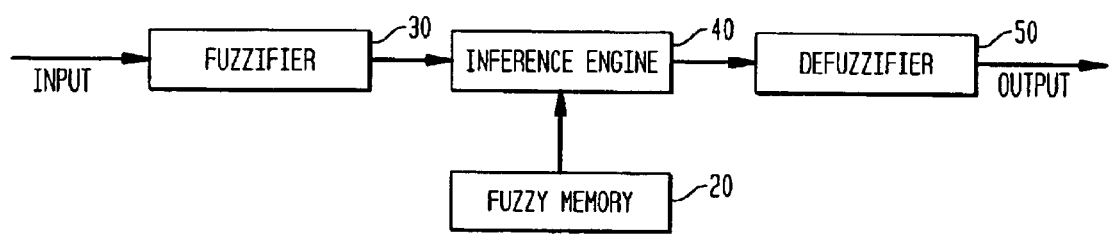
FIG. 6 is a block diagram of an exemplary prior art fuzzy logic system.

FIGS. 3 through 5 illustrate a simplified example of the present invention used in connection with stock market forecasting. For the purpose of this example, it is presumed that the following rules have been evolved:

Rule 1: If $D_1$ is PL and $D_2$ is NL, then T is PL
Rule 2: If $D_1$ is PS and $D_2$ is NL, then T is PS As shown in FIG. 3 in this example a "positive small" PS is deemed to be any value between 0 and 0.75 and a "positive large" PL value is deemed to be any value from 0.5 to 1. It is understood that the ranges from 0 to 1 and 0 to −1 along the X axis are normalized values representing the values that $D_1$ can take. Further, a "negative small" NS is deemed to be any value between 0 and −0.75, and a "negative large" NL is deemed to be any value from −0.5 to −1.

It is further assumed for this example that the input value for $D_1$ (correspondence to the actual rise or fall value for yesterday's market) is 0.65, and the input value $D_2$ (corresponding to the actual rise or fall of the market two days prior to the current date) is −0.85.

As shown in FIG. 3, when D1 is 0.65 this value intersects both the PS curve at 0.3 and the PL curve at 0.8 along the Y axis. The ranges from 0 to 1 along the Y axis represent normalized values that the membership function of $D_1$ can take. This indicates that the value for D1 is a fuzzy value which can be considered either a positive small or a positive large. As shown in FIG. 4, when $D_2$ is −0.85, it intersects only the NL curve. This indicates, among other things, that the value for $D_2$ is a crisp value. Thus, for the input values of D1=0.65 and $D_2$=−0.85, the following "sets" exist:

Set 1: $D_1$ is PL and $D_2$ is NL;
Set 2: $D_1$ is PS and $D_2$ is NL.

Since, as noted above, we know that the rules include Rules 1 and 2 which correspond to these values (e.g., Rule 1 gives us a solution "T is PL" when $D_1$ is PL and $D_2$ is NL; Rule 2 give us the result "T is PS" when $D_1$ is PS and $D_2$ is NL) then we can apply each of these two rules to Sets 1 and 2.

When a rule contains an AND operation, one method of applying the rule is by calculating the MIN for the two variables $D_1$ and $D_2$ in the equation. Thus, for Rule 1 the following equation applies:

$$T=PL|_{MIN(0.8,\ 1)}; \text{ thus, } T=PL|_{0.8}$$

Thus the result for Rule 1 is that T is 0.8 on the positive large curve.

The same operation is applied to Rule 2 using the following equation:

$$T=PS|_{MIN(0.3,\ 1)}; \text{ thus, } T=PS|_{0.3}$$

The result is that T is 0.3 along the PS curve.

FIG. 5 shows the result of the application of the two rules. As shown in FIG. 5, the PL and PS curves of FIG. 3 have been reduced to reflect the application of Rules 1 and 2 to the input values, so that the PL curve is "cut off" at 0.8, defining a trapezoidal area 1, and the PS curve is cut off at 0.3, defining a second trapezoid defined by area 2. By taking the centroid of these two trapezoids, the projection for today's market can be achieved taking into consideration the fuzzy values associated with the input $D_1$. The centroid can be calculated by adding the area of trapezoids 1 and 2 and dividing them by the length L corresponding to the total span of the bases of the two trapezoids. For example, if we assume that area 1 equals 0.402 and area 2 equals 0.235, and that length L equals 1, then the projection for today's market T equals 0.637.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

I claim:

1. A method for deriving an optimized rule set for a fuzzy logic system, said method comprising the steps of:

generating a pool of random rules having a fitness function and storing said random rules;

evolving said random rules using a genetic algorithm to improve the fitness function of said rules in said random rule set until the overall fitness function of said rules plateaus, thereby generating an optimized rule; and storing said optimized rule in an optimized rule storage area, said rules stored in said optimized rule storage area comprising said optimized rule set.

2. A method as set forth in claim 1, wherein said generating step includes the steps of:

checking said optimized rule storage area to determine if it contains any optimized rules; and using any optimized rules contained in said optimized rule storage area when generating said pool of random rules.

3. A method is set forth in claim 1, wherein said evolving step comprises evolving the features of said random rules.

4. A method is set forth in claim 1, wherein said evolving step comprises evolving the qualifiers of said random rules.

5. A method is set forth in claim 1, wherein said evolving step comprises evolving the operators of said random rules.

6. A method is set forth in claim 1, wherein said evolving step comprises evolving the features, cases, qualifiers, and operators of said random rules.

7. A method as set forth in claim 1, wherein said generating, evolving, and storing steps are repeated until a predetermined number of optimized rules are stored as said optimized rule set.

8. A method as set forth in claim 7, wherein said repeating of said steps occurs on a real-time basis.

9. At method for deriving an optimized rule set for a fuzzy logic system for use in stock market analysis, said method comprising the steps of:

generating a pool of random rules having a fitness function and storing said random rule;

evolving said random rules using a genetic algorithm to improve the fitness function of said rules in said random rule set until the overall fitness function of said rules plateaus, thereby generating an optimized rule;

storing said optimized rule in an optimized rule storage area, said rules stored in said optimized rule storage area comprising said optimized rule set;

applying a stock market data set to said optimized rule set; and outputting a stock market analysis result based on the application of said stock market data set to said optimized rule set.

10. A method is set forth in claim 9, wherein said evolving step comprises evolving the features of said random rules.

11. A method is set forth in claim 9, wherein said evolving step comprises evolving the qualifiers of said random rules.

12. A method is set forth in claim 9, wherein said evolving step comprises evolving the operators of said random rules.

13. A method is set forth in claim 9, wherein said evolving step comprises evolving the features, cases, qualifiers, and operators of said random rules.

14. A method as set forth in claim 9, wherein said generating, evolving, and storing steps are repeated until a predetermined number of optimized rules are stored as said optimized rule set.

15. A method as set forth in claim 14, wherein said repeating of said steps occurs on a real-time basis.

16. A method as set forth in claim 9, wherein said stock market data set comprises data regarding a particular stock choice.

17. A method as set forth in claim 9, wherein said stock market data set comprises data regarding a particular stock market.

18. A method as set forth in claim 9, wherein said stock market data set comprises data regarding comprising a particular segment of stocks.

19. A method as set forth in claim 9, wherein said stock market data set comprises data regarding comprising mutual funds.

20. A method as set forth in claim 9, wherein said stock market data set comprises data regarding comprising futures.

* * * * *